US007486641B2

(12) United States Patent
Reddy et al.

(10) Patent No.: US 7,486,641 B2
(45) Date of Patent: Feb. 3, 2009

(54) MOBILITY MANAGEMENT IN WIRELESS INTERNET PROTOCOL NETWORKS

(75) Inventors: Joseph Soma Reddy, La Jolla, CA (US); Anthony Acampora, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 181 days.

(21) Appl. No.: 11/123,860

(22) Filed: May 5, 2005

(65) Prior Publication Data

US 2005/0226197 A1 Oct. 13, 2005

Related U.S. Application Data

(63) Continuation of application No. 09/860,940, filed on May 18, 2001, now Pat. No. 6,907,017.

(60) Provisional application No. 60/206,443, filed on May 22, 2000.

(51) Int. Cl.
*H04Q 7/00* (2006.01)
(52) U.S. Cl. .................. 370/331; 370/356; 370/401; 370/475
(58) Field of Classification Search .......... 370/338, 370/352–356, 401, 331, 475, 349, 469; 709/249
See application file for complete search history.

(56) References Cited

U.S. PATENT DOCUMENTS

| 6,549,522 | B1 | 4/2003 | Flynn |
| 6,636,522 | B1 | 10/2003 | Perinpanathan et al. |
| 6,654,359 | B1 | 11/2003 | La Porta et al. |
| 6,754,328 | B1* | 6/2004 | Takahashi .............. 379/220.01 |
| 7,042,876 | B1* | 5/2006 | Jayasenan et al. .......... 370/389 |
| 7,158,497 | B2* | 1/2007 | Li et al. ..................... 370/331 |
| 2001/0036284 | A1* | 11/2001 | Kinoshita et al. .......... 370/389 |
| 2002/0057657 | A1* | 5/2002 | La Porta et al. ........... 370/331 |
| 2004/0024901 | A1 | 2/2004 | Agrawal et al. |

OTHER PUBLICATIONS

Castelluccia et al.; A Hierarchical Mobility Management Framework for the Internet; IEEE Intl. Workshop on Mobile Multimedia Communications; Nov. 1999, pp. 149-153.
Ramjee et al.; Hawaii: A Domain-Based Approach for Supporting Mobility in Wide-Area Wireless Networks; IEEE/ACM Transactions on Networking, vol. 10, No. 3; Jun. 2002; pp. 396-410.
Valko, et al.; Cellular IP: A New Approach to Internet Host Mobility; ACM Computer Communication Review; pp. 50-65, Jan. 1999.

* cited by examiner

*Primary Examiner*—Sujatha Sharma
(74) *Attorney, Agent, or Firm*—Fish & Richardson P.C.

(57) ABSTRACT

Handoff of (i) a mobile wirelessly communicating device—a mobile—between (ii) as plurality of stationary base stations within cells within a domain of (iii) a stationary gateway router all within (iv) a communications network based on the Internet Protocol (IP) is without interchange of control and responsive to the mobile, only. The gateway router assigns to the mobile at a time before the handoff IP addresses suitable for the mobile to connect to the gateway router through all the plurality of base stations of the domain. Unilaterally deriving a handoff decision to switch base stations, the mobile directs its wireless communications link to a new base station where signal level registration is performed. Responsive to a link layer trigger at the new base station, the gateway router is informed of the handoff, and both the router and the mobile independently construct the mobile's new IP address.

11 Claims, 2 Drawing Sheets

MOBILITY MANAGEMENT IN WIRELESS INTERNET PROTOCOL NETWORKS

CROSS-REFERENCE TO RELATED PATENT APPLICATIONS

The present patent application is a continuation (and claims the benefit of priority under 35 USC 120) of U.S. patent application Ser. No. 09/860,940 entitled "Mobility Management in Wireless Internet Protocol Networks" and filed May 18, 2001 (U.S. Pat. No. 6,907,017, published Nov. 22, 2001), which is descended from, and claims benefit of priority of, U.S. provisional patent application Ser. No. 60/206,443 filed on May 22, 2000, for MOBILITY MANAGEMENT IN WIRELESS IP NETWORKS to the selfsame inventors as the present patent application.

BACKGROUND OF THE INVENTION

1. Field of the Invention

The present invention generally concerns the wireless internet, and cellular networks.

The present invention particularly concerns micromobility protocols as control, the inter-cell handoff of a mobile wirelessly communicating device between stationary base stations within cells in a cellular communications network based on the Internet Protocol (IP).

2. Description of the Prior Art 2.1 General Background

By way of general background, over the past decade two unprecedented events have radically transformed the nature of modern telecommunications. The first of these is the meteoric rise and spread of the Internet, resulting in a new world wide telecommunication infrastructure based upon high speed, packet based, bandwidth upon demand as needed to support a vast array of new multimedia service offerings and applications. The second is the equally impressive emergence of cellular radio based systems which enable, in essence, wireless voice communications to small battery operated cell phones.

At the vanguard of modern telecommunications is the convergence of these two megatrends, the result of which will be a high speed, packet based wireless network capable of delivering to small handheld terminals the same grade and range of Internet based services now available only to desktop computers. Characterizing this trend are packet switching (as opposed to circuit switching), broadband (as opposed to voiceband) and on-demand bandwidth as needed to deliver multimedia content filled data files between wireless terminals and web sites.

2.2 The Particular Issue of Mobility Management in a Broadband Small-Cell Wireless Mobile Communications Network Due to the growing demand for providing packet data services to the mobile world, future cellular networks are expected to be based on the Internet Protocol (IP). Packets will be routed up to stationary base stations using IP routers and then transmitted over the air to mobile hosts. Thus the cellular infrastructure will be an extension of the internet.

However, the Internet was designed as a network of stationary hosts. The IP address identifies the point of attachment of the host rather than the host itself. Hence, a mobile host will need to change its IP address whenever it moved to a new base station, causing all existing connections to break down. The Mobile IP was designed to enable routing of packets to mobile hosts. See Charles Perkins, editor, "IP Mobility Support," Internet RFC 2002, October 1996. The Mobile IP permits a mobile host to maintain a constant IP address even when it changes its point of attachment. However, while Mobile IP works well for nomadic hosts, its high latency and overhead make it unsuitable in situations requiring fast and frequent handoffs, such as might occur within a cellular network.

Thus, a hierarchical approach is needed with (i) a micromobility protocol that can manage host mobility within a large domain (intradomain mobility), and (ii) a macromobility protocol to handle mobility between domains (interdomain mobility). In other words, the global wireless infrastructure is divided into domains each of which spans an area large enough so that mobile handoffs between them are infrequent. Also, each domain is under the administrative control of a single operator. Mobility within a domain is managed by a micromobility protocol while handoffs from one domain to another are handled by the macromobility protocol. (See FIG. 1)

While Mobile IP is a natural choice for the macromobility protocol, several proposals exist for the micromobility protocol. See A. G. Valko, "Cellular IP—A New Approach to Internet Host Mobility," ACM Computer Communication Review, January 1999; Ramachandran Ramjee, et. al.,"HAWAII: A Domain-based Approach for Supporting Mobility in Wide area Wireless Networks," International Conference on Network Protocols, ICNP'99; and Claude Castelluccia and Ludovic Bellier, "A Hierarchical Mobility Management Framework for the Internet," IEEE Intl. Workshop on Mobile Multimedia Communications, November 1999.

It is possible that each wireless communications network operator will implement a protocol of its own choice for micromobility within its domain. If a single handset is to operate on a global level, it must be capable of detecting which micromobility protocol is used in the current domain, and then executing accordingly. A software radio based handset, with the capability to execute one of several different protocols, would be ideal for such a role. Also, if the particular micromobility protocol is not available with the handset, it should be capable of downloading the required software components over the air. Thus a single handset would be able to roam on a global scale.

The present invention concerns one possible micromobility scheme.

SUMMARY OF THE INVENTION

In a wireless cellular communications network based on the Internet Protocol (IP) where packets to and from a mobile wirelessly communicating device—called a mobile—(i) are routed on (most commonly) land lines up to stationary base stations by use of IP routers, (ii) are routed between large wireless domains (partitioned from the global wireless infrastructure) by a macromobility protocol, and (iii) are routed intradomain, including during handoffs between base stations, by a micromobility protocol, the present invention contemplates a new micromobility protocol and mobility management scheme.

In particular, the present invention contemplates handing off a mobile wirelessly communicating device—called "a mobile"—between successive base stations with very little delay relative to alternative schemes, thus minimizing risk of packet loss. The fast handoff is realized in at least two, a first and a second, parts. In a first part an IP network element—which may already exist—called a "gateway router" is newly programmed to manage the IP addresses of a number of mobiles that may at any one time be connected through various ones of a number of base stations communicating with, and through, this gateway router. The gateway router in combination with its connected base stations constitutes (in one variant of the invention) a "domain". Circa 2001, a "domain" is most typically an extended geographical area, like a city. In a second part, the fast handoff is realized by each mobile itself, which mobile likewise programmed to enforce the micromobility protocol.

The new micromobility protocol of the present invention—which is enforced between the (i) gateway router and (ii) the mobiles within the domain of the gateway router without the active involvement of the intermediary base stations—is not difficult to understand, but does possess at least two unique characteristics.

First, at a time of connection admission of a mobile to a domain the mobile is assigned by the gateway router not merely one IP address reflective of the base station through which the mobile is instantly communicating (at time of its registration to the domain), but rather an entire set of IP addresses as besuit its potential connection to the gateway router through each and every base station in the domain (one base station at a time, of course). In simplest possible terms, this first aspect of the micromobility protocol of the present invention may be stated to be that "the mobile picks up a complete set of all IP addresses that it might ever need for communication through any of the base stations of a domain at a time of first connection to the domain".

Second, when, responsively to monitoring signals from the base stations, the mobile (solely and only) decides to change the base station through which it connects to the network (as will normally be a consequence of movement of the mobile), then the mobile will summarily do so without any exchanging (with anything) any control packets—as have previously been used in other protocols to coordinate handoffs—whatsoever. To repeat, when the mobile hands off from one base station to another (within a single domain, under the micromobility protocol of the present invention) then it will exchange no handoff information whatsoever, making the handoff to be extremely fast and simple.

In this second aspect of the micromobility protocol of the present invention—the handoff—the new base station will initiate a link level trigger in respect of (packets now received from) the newly-connected mobile. This trigger alerts the gateway router that the mobile now has a new IP address. Quite unsurprisingly, this new IP address of the mobile is one of the set of IP addresses originally assigned to the mobile. As a somewhat more subtle occurrence, however, both (i) the mobile and (ii) the gateway router independently come to recognition of what the new IP address of the mobile now is. In simplest possible terms, this second aspect of the micromobility protocol of the present invention may be stated to be that "the mobile hands off between base stations unilaterally, at which time both the mobile and the gateway router independently recognize the new IP address of the mobile".

The micromobility scheme, and protocol, of the present invention operates fast: there is absolutely no over the air signaling to effectuate handoff, and handoff latency is limited to delay in the radio level of the handoff, and in the wired network. To repeat, the present invention requires zero (0) packets transmitted over the air as delay-inducing (and, of lesser importance, radio signaling) overhead during a handoff, as opposed to two (2) packets in the Cellular IP protocol, or four (4) packets in the Mobile IP protocol. Handoff latency is accordingly typically reduced by the present invention to the order of 40 ms. as opposed to, most typically, approximately 180-240 ms. for Cellular IP, or 340-460 ms. for Mobile IP.

The low latency helps to preclude the loss of any packets and, as a matter of lesser importance in IP, that packets should be received out of sequence. Equally, or more, importantly, the fast handoff scheme of the present invention prospectively permits that the capacity of a cellular network may be increased. Handoffs are a present actual, and likely future, "bottleneck" in IP protocol cellular communications networks, and a network that can handle handoffs faster can support more IP protocol wirelessly communicating cellular devices.

Handoffs in accordance with the present invention are completely seamless to the user (of the mobile): latency is reduced so far so as for the first time become normally unnoticeable.

Wireless network infrastructure requirements to realize the present invention are exceedingly modest: only the one additional node of the gateway router is mandated. This device normally already exists but will, in accordance with the present invention, need to be (re-)programmed to manage the micromobility protocol. The IP mobiles are, of course, initially programmed to the micromobility protocol of the present invention (and other protocols, such as the Mobile IP for changing between domains) at time of manufacture.

The present invention is completely scalable.

1. Low-latency Typically Lossless Handoff Without Over-the-Air Signaling

Accordingly, in one of its aspects the present invention can be considered to be embodied in a method of an inter-cell handoff of (i) a mobile wirelessly communicating device between (ii) stationary base stations associated with cells in a cellular communications network based on the Internet Protocol (IP).

The method is broadly characterized in that 1) there is no, zero, over-the-air signaling to effectuate handoff; and 2) handoff latency is limited to delays in a radio level of the handoff and in a wired network between the stationary base stations.

Of course, these characterizations—unique to the handoff of the present invention—do not precisely describe how the handoff is done. In part, the handoff is effectuated by self-registration of the mobile device at a new base station—whereupon the self-registration the handoff is summarily completed.

An astute expert in cellular communications sciences and engineering will at this point recognize that this "self-registration" is an interesting idea, but that it cannot be the "entire story": there must be something else that permits the "self-registration" to work in an IP network. This "something else" is, of course, that, at a time before the handoff, there is assigned to the mobile by a "gateway router" node of the network not just one IP address from this gateway router to the mobile through an initial one base station through which the mobile is instantly communicating, but there is instead assigned to the mobile, and stored therein, an entire set of IP addresses from the gateway router node through each base station in the domain (of the gateway router) to the mobile, wheresoever the mobile may be.

The subsequent self-registration of the mobile device with its new base station during the handoff may then be understood to transpire in consideration of the selection of one stored IP address from the complete set of IP addresses previously stored in the mobile.

2. Registration Through a Set Of Addresses, Followed by the Subsequent Uses of these Addresses for Handoffs In the previous section 1 it was discovered that the present invention could be uniquely characterized by its (i) low-latency (ii) typically lossless handoffs (iii) without over-the-air signaling, but that this remarkable micromobility handoff capability was ultimately rooted in other, earlier, preparatory steps. It is accordingly alternatively possible to view the present invention as being embodied in these other, earlier, steps which ultimately permit the (i) low-latency (ii) typically lossless handoffs (iii) without over-the-air signaling.

The present invention may thus be considered to be embodied in a method of registering the IP address of an IP addressable mobile wirelessly communicating device—called a mobile—that communicates through various stationary base stations, one base station at a time,. within a cell in a domain of a cellular communications network based on the IP. The preferred method is characterized in that at a time of connection admission of a mobile to the network there are assigned (actually by the domain root node called a "gateway router", but alternatives are possible) at least two things. First, the mobile is given one current IP address reflective of base station through which the mobile is communicating. However, second, the mobile is also given, and subsequently stores, multiple IP addresses reflective of all the other base stations in the domain through which base stations the mobile could potentially communicate.

Accordingly is assigned not simply one single IP address from the network root node, or "gateway router" to the mobile through only that initial one base station through which the mobile instantly first communicates, but there is instead assigned to the mobile an entire set of IP addresses from the root node, or "gateway router", through each and every each base station in the domain of the IP network.

This assigning of the multiple IP addresses during the registration of the IP mobile permits, at a later time then the assigning, the simple, efficient and loss-free handing off the mobile so registered between successive base stations of the network. The method so extended is further characterized in that when, due to movement, the mobile unilaterally decides to handoff itself to another, new, base station, then the mobile will summarily do so. The mobile will do so by reference to its assigned set of IP addresses, self-registering with a selected new base station.

3. Addressing Mobiles in an Internet Protocol (IP) Cellular Communications Network The present invention may still further be considered to be embodied in an improvement to addressing within an Internet Protocol (IP) cellular communications network having (i) a gateway router communicating to intermediate cellular base stations within its domain—the domain of the gateway router—and further through these base stations to wireless mobile devices called "mobiles", and (ii) mobile wirelessly communicating devices—the mobiles—moving so as to communicate at different times to and through different ones of the base stations within the domain back to the gateway router.

In this network the improvement in accordance with the present invention is so that a mobile is assigned a public IP address at the gateway router, but the mobile also has a current address at the base station with which it is communicating. By this "dual address" packets addressed to the mobile first reach the gateway router, and then the gateway router funnels the packets to the mobile's current base station address.

The improvement is thus of the nature of micromobility scheme supporting hand-offs of the mobile between base stations.

4. Mobiles Making Hand-Off Decisions in an Internet Protocol (IP) Cellular Communications Network The present invention may yet still further be considered to be embodied in an improvement to hand offs within an Internet Protocol (IP) cellular communications network having (i) a gateway router communicating to and through intermediate base stations within its domain—the domain of the gateway router—to mobile wirelessly communicating devices—called "mobiles"—, and (ii) mobile wirelessly communicating devices—the mobiles—moving so as to communicate at different times to and through different ones of the base stations within the domain back to the gateway router.

In this network the improvement is so that a mobile measures pilot channels of one or base stations neighboring the base station through which it is presently communicating (and addressed); and, a decision to switch base stations being derived, the mobile unilaterally (i) makes a handoff decision and (ii) tunes its radio to the new base station. At this time the mobile also (iii) performs radio level registration with the new base station. A link layer trigger at the new base station informs the network layer of this handoff, and most particularly informs the gateway router of the handoff.

Notably, (i) the mobile and (ii) the gateway router both independently construct the mobile's new IP address. Thereafter the gateway router uses this new IP address of the mobile to tunnel packets to the mobile through the proper new base station.

The improvement is thus of the nature of micromobility protocol supporting hand-offs of the mobile between base stations.

These and other aspects and attributes of the present invention will become increasingly clear upon reference to the following drawings and accompanying specification.

BRIEF DESCRIPTION OF THE DRAWINGS

Referring particularly to the drawings for the purpose of illustration only and not to limit the scope of the invention in any way, these illustrations follow.

DESCRIPTION OF THE PREFERRED EMBODIMENT

The following description is of the best mode presently contemplated for the carrying out of the invention. This description is made for the purpose of illustrating the general principles of the invention, and is not to be taken in a limiting sense. The scope of the invention is best determined by reference to the appended claims.

Although specific embodiments of the invention will now be described with reference to the drawings, it should be understood that such embodiments are by way of example only and are merely illustrative of but a small number of the many possible specific embodiments to which the principles of the invention may be applied. Various changes and modifications obvious to one skilled in the art to which the invention pertains are deemed to be within the spirit, scope and contemplation of the invention as further defined in the appended claims.

1. Micromobility Protocol

Figure 1:
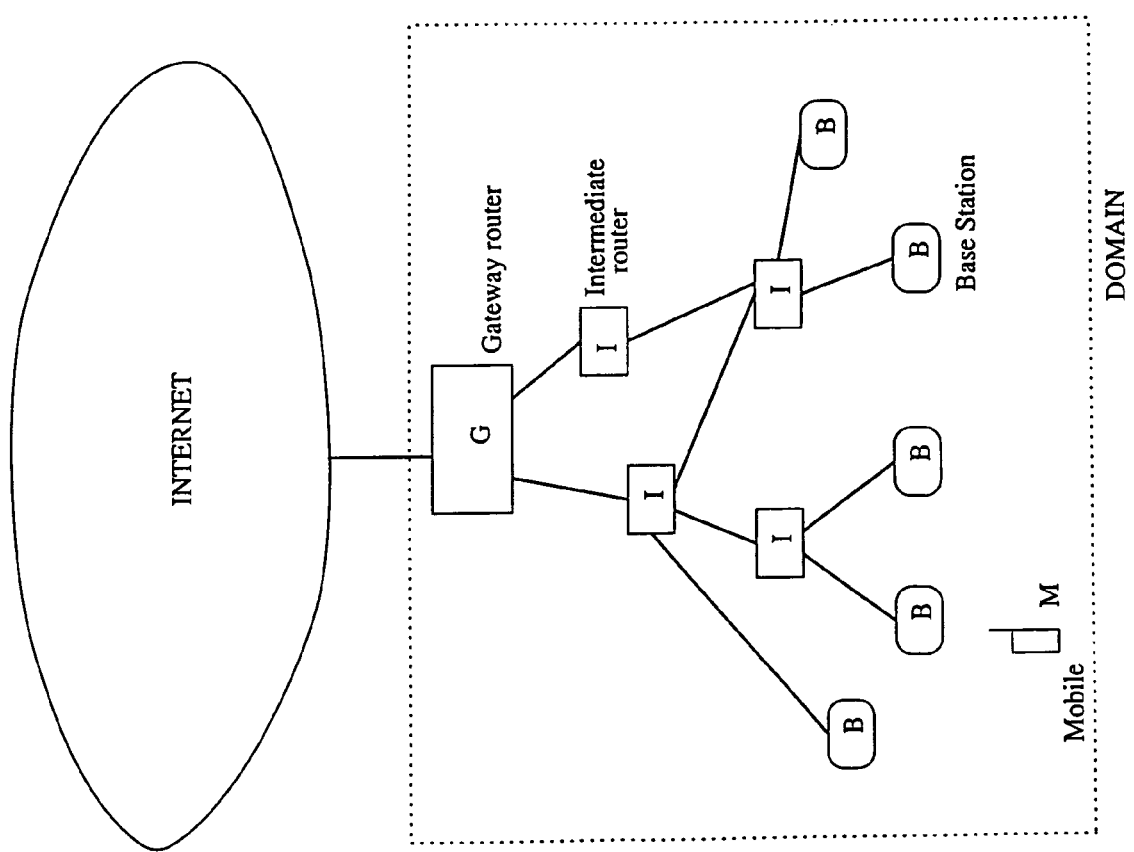
FIG. 1 is a diagrammatic view showing a IP network architecture having a domain in which the micromobility protocol and method of the present invention is operative.

As illustrated in FIG. 1—showing an exemplary IP network architecture having a domain in which the micromobility protocol and method of the present invention is operative—a typical domain consists of a gateway router, several base stations and some intermediate routers. The domain is connected to the Internet through the gateway router.

A mobile host that is admitted to the domain is loaned an IP address that can be used as long as the mobile is connected to a base station within the domain. Packets addressed to the mobile's IP address reach the gateway router (through the network id portion of the IP address) and are routed to the base station and transmitted to the mobile. As the mobile host moves from one base station to another within the domain, the micromobility protocol ensures that packets addressed to it are routed to the current serving base station and delivered to the mobile.

Each domain owns a pool of global IP addresses and all packets sent to these addresses on the Internet are routed to the Gateway router based on the network id portion of the address. In addition, each base station is assigned a set of private IP addresses and the intermediate routers are configured to route all packets addressed to these private IP addresses to the respective base stations. The configuration of the intermediate routers may be done manually or through standard routing protocols.

When a mobile is admitted to a domain, it is loaned a global IP address. The mobile uses this address in it communications with other hosts on the Internet as long as it connected to a base station within the domain. It is also assigned a set of private IP addresses, each of which belongs to a particular base station.

Packets addressed to the mobile's IP address reach the Gateway router (based on the network id portion of the address). The Gateway encapsulates the packet with in another IP packet and sets the destination address to the private IP address of the mobile corresponding to its current serving base station. The encapsulated packet is routed to the current serving base station and transmitted over the air to the mobile where it is de-encapsulated.

When the mobile performs a handoff between base stations, a control message is sent by the new base station to the Gateway router informing it of the change in the identity of the current serving base station. The Gateway router correspondingly changes the private IP address it uses for encapsulating packets destined to the mobile. Thus packets destined to the mobile are always routed to the correct base station.

The tunneling of packets between the Gateway router and the mobile is transparent to the transport and application layers in the mobile, which are only aware of the global IP address loaned to the mobile and which communicate with other hosts on the. Internet using that address.

The Gateway router maintains tables relating each mobile with the global IP address it has been loaned and its current serving base station. The table entry for each mobile is created when the mobile is admitted to the domain and the current serving base station field is updated every time the mobile performs a handoff. Each base station maintains a table relating each mobile connected to it with its link layer address. The entry for each mobile is created when the mobile is connected to the base station.

2. Example

We will use the private address space 10.*.*.* for our private addresses, where the notation *.*.*.* where each * represents a number will be recognized to be standard for a URL, or uniform resource locator on an Internet Protocol (IP) network and addressing scheme. Let each base station have an identifier $b_i$ of, say, 8 bits length. Similarly, let each mobile have an identifier $m_i$ of, say, 16 bits length. These identifiers are meaningful and unique only within a domain (i:e: they are reused by base stations and mobiles in other domains). Let the pool of private addresses $10.b_i.*.*$ be assigned to base station $b_i$. Thus all packets with destination address $10.b_i.*.*$ would be forwarded to base station $b_i$.

Mobile $m_i$ would need to be assigned a set of private addresses, one from each base station's pool. Let $10.*.m_i$ be the set of private addresses assigned to the mobile $m_i$. Then, mobile $m_i$, when connected to base station $b_i$, can be reached with the address $10.b_i.m_i$. The Gateway router maintains a mapping between each global IP address (belonging to the domain's pool) and the identifier $m_i$ of the mobile it has been loaned to. It also maintains a mapping between a mobile's identifier $m_i$ and the identifier $b_i$ of its current serving base station. When it receives a packet destined to a global IP address (belonging to the domain's pool), it constructs the current private IP address of the mobile using the two mappings and tunnels the packet to that address. Each base station maintains a mapping between the mobile identifier $m_i$ and its link layer address. Upon receiving a packet, it derives the mobile identifier from the destination IP address, looks up the link layer address corresponding to it and delivers the packet.

3. An Alternative Architecture

Figure 2:
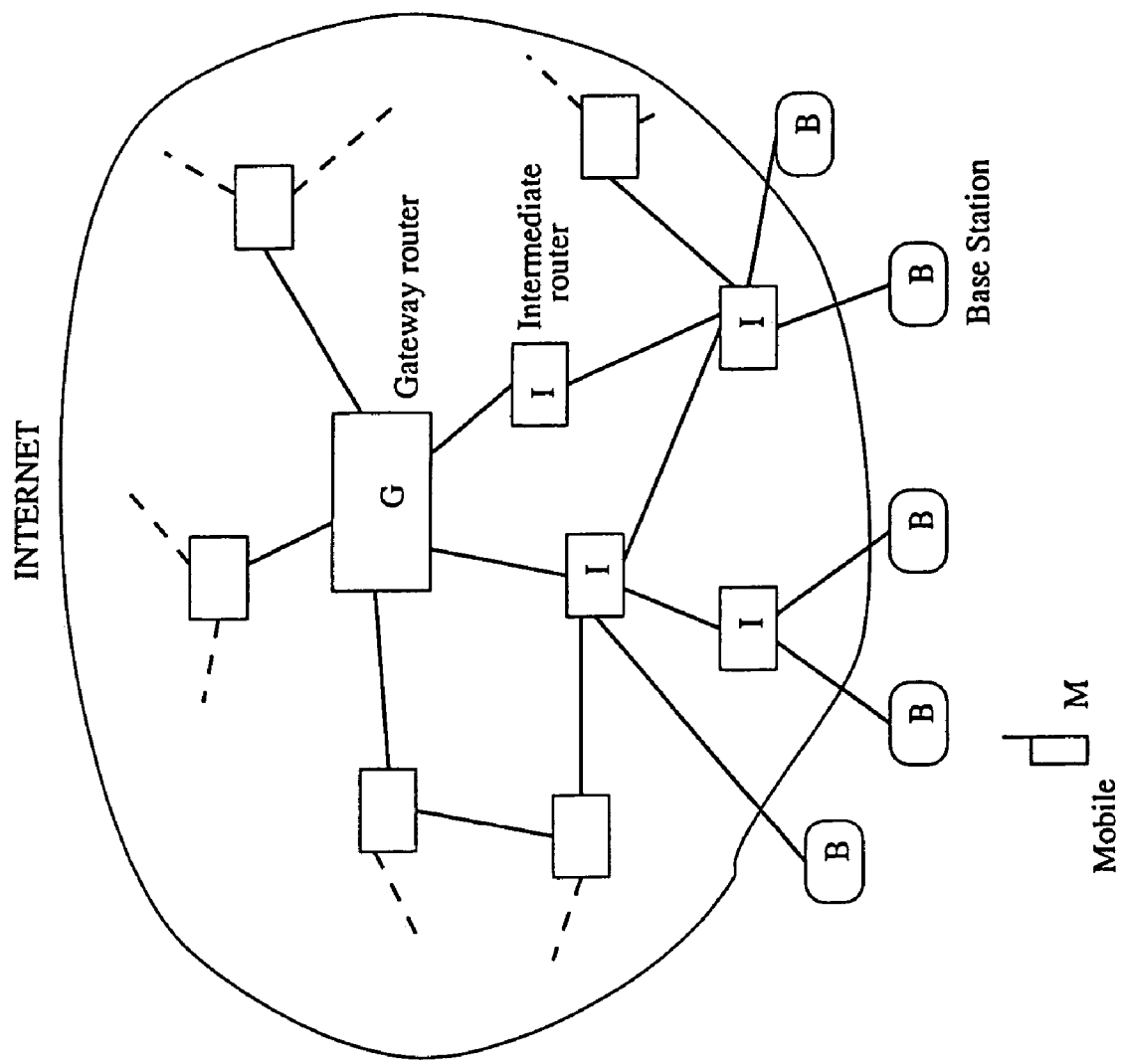
FIG. 2 is a diagrammatic view showing a domain-less IP network architecture in which the micromobility protocol and method of the present invention is operative.

An alternate to the wireless network architecture envisioned in the above scheme is illustrated in FIG. 2. In this architecture, each base station is connected to the Internet directly. The intermediate routers are part of the Internet and forward traffic that does not necessarily belong to the wireless network. Thus, it is not feasible to use addresses belonging to the private IP address space since routers on the Internet are required not to forward such packets. A different micromobility protocol is described below for this architecture.

Note that since the network architecture described in previous section 1 is a special case of the network architecture described in this section 3, the following protocol may also be used in place of the protocol described in section 2 for the network architecture described in section 1.

Each domain owns a pool of global IP addresses. The gateway router advertises reachability of these addresses and packets addressed to them arrive at the gateway router. Also, each base station owns an IP address since it is connected to the Internet. When a mobile is admitted to a domain, it is loaned a global IP address from the domain's pool. This address is used by the mobile to communicate with other hosts on the Internet as long as it is connected to a base station within the domain.

Packets addressed to the mobile's IP address first reach the gateway router. The gateway router encapsulates the packet. The packet is routed to the current serving base station over the Internet. The base station decapsulates the packet and transmits it over the air to the mobile.

When the mobile performs a handoff between base stations, a control message is sent to the gateway router informing it of the change in the identity of the current serving base station. This control message may be sent either by the mobile or the new base station. The gateway router then changes the IP address it uses for encapsulating packets destined for the mobile. Thus packets destined to a mobile are always routed to the correct base station.

The tunneling of packets between the gateway router and the base stations is transparent to the mobile, and the mobile communicates with other hosts on the Internet with the global IP address it has been loaned.

The Gateway router maintains tables relating the global IP address a mobile has been loaned and the IP address of its current serving base station. The table entry for each mobile is created when the mobile is admitted to the domain and the field identifying the base station currently serving the mobile is updated whenever the mobile performs a handoff.

Each base station maintains a table relating the global IP address loaned to each mobile that is connected with it and the link layer address of the mobile. The entry for each mobile is created when it connects with the base station.

4. Discussion

Other approaches to micromobility try to update the routing tables when a mobile changes its point of attachment. The present invention keep the routing tables constant and instead uses a new (and possibly private!) IP address for the mobile whenever it changes its point of attachment. The use of a different address at each base station is kept transparent to the mobile through encapsulation and decapsulation.

Among the IP routing equipments—i.e., the gateway and intermediate routers—only the gateway router needs to be modified—namely, by additional software—to realize the present invention. The intermediate routers in the domain are standard Internet routers.

The private IP network can be designed to enable automatic assignment of private IP addresses to the mobile. As shown in the example, the private address of the mobile at each base station can be constructed easily.

Design of the private IP network in accordance with the present invention can serve to (i) simplify the routing of packets by the intermediate routers and (ii) improve the scalability of the domain. As shown in the example, by defining each base station to be a subnet comprising of all mobile hosts in the domain, packets can be routed only on the basis of their subnetwork identifier (i.e, their base station identifier). Thus, the intermediate routers would have only one routing table entry per base station rather than one entry per mobile.

5. Summary Results

The micromobility management scheme of the present invention achieves fast handoffs with no involvement of the mobile at each handoff. There are no signalling messages exchanged over the air at each handoff. This reduces overhead on the wireless link. The handoff latency is reduced since message exchange over the air typically takes greater amount of time due to the slower speed of the wireless link. Also, standard IP routers can be used for intermediate routers and, with little extra software, for the gateway router.

It is possible that several micromobility protocols will be in use by different networks. A software radio based handset would be an ideal choice in such a situation so that a single handset is capable of roaming globally.

In accordance with the preceding explanation, variations and adaptations of the micromobility protocol and method in accordance with the present invention will suggest themselves to a practitioner of the network and/or wireless communications arts.

For example, any of the routers and/or base stations may be given alternative names, and may themselves be wireless communicative—such as by free-space laser beam—without detracting from the essence of the present invention to support efficient and speedy hand-off of mobiles in an IP network.

In accordance with these and other possible variations and adaptations of the present invention, the scope of the invention should be determined in accordance with the following claims, only, and not solely in accordance with that embodiment within which the invention has been taught.

What is claimed is:

1. A method for wirelessly communicating based on the Internet Protocol (IP), comprising:

assigning to a gateway router a set of IP addresses to address a mobile through one of a plurality of base stations within a domain associated with the gateway router when an initial communication is established between the domain and the mobile;

monitoring handoffs of the mobile station from one base station to another within the domain to obtain updated information of a serving base station that is currently serving the mobile; and routing data from the gateway router to the serving base station to address the mobile at one of the set of IP addresses corresponding to the serving base station so that the IP address of the mobile changes each time the mobile hands off to a new serving base station.

2. The method as in claim 1, further comprising:

encapsulating a data packet addressed to the mobile at the gateway router;

routing the encapsulated data packet to the serving base station;

decapsulating the encapsulated data packet at the serving base station; and delivering the decapsulated data packet from the serving base station to the mobile.

3. The method as in claim 1, further comprising:

encapsulating a data packet addressed to the mobile at the gateway router; and routing the encapsulated data packet to the mobile via the serving base station so that decapsulating of the encapsulated data packet occurs at the mobile.

4. The method as in claim 1, further comprising:

assigning to the gateway router a set of global IP addresses to address the base stations associated with the gateway router; and assigning to at least one more gateway router, which controls IP routing in another set of stationary cellular base stations, a different set of global IP addresses.

5. A method for wirelessly communicating based on the Internet Protocol (IP), comprising:

assigning to a gateway router within a domain a set of IP addresses to address a mobile through one of a plurality of base stations associated with the gateway router when an initial communication is established between the domain and the mobile;

monitoring handoffs of the mobile station from one base station to another within the domain to identify a serving base station as a result of each handoff and the associated IP address for the mobile at the serving base station, wherein the associated IP address is one of the set of IP addresses;

operating the gateway router to change an IP address, previously used for the mobile before the handoff to the serving base station, to the associated IP address;

operating the gateway router to encapsulate a data packet for the mobile with the associated IP address to route the encapsulated data packet to the serving base station which in turn delivers the data packet to the mobile.

6. The method as in claim 5, comprising:

decapsulating the encapsulated data packet for the mobile at the serving base station; and operating the serving base station to deliver the data packet to the mobile without the associated IP address.

7. The method as in claim 5, comprising:

operating the serving base station to deliver the encapsulated data packet with the new IP address to the mobile without first decapsulating the encapsulated data packet; and wherein the mobile decapsulates the encapsulated data packet to recover the data packet.

8. A method for wirelessly communicating based on the Internet Protocol (IP), comprising:

assigning to a gateway router within a domain a set of IP addresses to address a mobile through one of a plurality of base stations associated with the gateway router when an initial communication is established between the domain and the mobile;

establishing IP tunneling channels to different base stations associated with different IP addresses within the assigned set of IP addresses;

monitoring handoffs of the mobile station from one base station to another within the domain to identify a serving base station as a result of each handoff and the associated IP address for the mobile at the serving base station, wherein the associated IP address is one of the assigned set of IP addresses;

operating the gateway router to change an IP address previously used for the mobile before the handoff to the associated IP address; and operating the gateway router to use the associated IP address for the mobile to select one of the established IP tunneling channels, that is assigned with the associated IP address during establishing the IP tunneling channels, to route a data packet for the mobile via the serving base station to the mobile.

9. The method as in claim 8, comprising:

receiving from the mobile a signal which indicates a handoff of the mobile to the serving base station in a manner that is transparent to transport and application layers in the mobile.

10. A gateway router configured to couple a domain to a communication network, comprising: instructions for carrying out operations comprising:

receiving a set of Internet Protocol (IP) addresses to address a mobile through a base station associated with the gateway router when an initial communication is established between the domain and the mobile;

monitoring handoffs of the mobile from one base station to another within the domain to identify a serving base station as a result of each handoff and an associated IP address for the mobile at the serving base station, wherein the associated IP address is one of the set of IP addresses;

changing an IP address previously used for the mobile before the handoff to the serving base station that is associated with the associated IP address; and encapsulating a data packet for the mobile with the associated IP address to route the encapsulated data packet to the serving base station which in turn delivers the data packet to the mobile.

11. A mobile device for wirelessly communicating based on the Internet Protocol (IP), comprising:

instructions for carrying out the acts comprising:

receiving a set of IP addresses through which a plurality of base stations associated with a gateway router communicate with the mobile device;

monitoring handoffs from one base station to another within the plurality of base stations to obtain updated information of a serving base station that is currently serving the mobile device; and receiving packets on one of the set of IP addresses corresponding to the serving base station so that the IP address of the mobile device changes each time the mobile hands off to a new serving base station.

* * * * *

UNITED STATES PATENT AND TRADEMARK OFFICE
CERTIFICATE OF CORRECTION

PATENT NO. : 7,486,641 B2
APPLICATION NO. : 11/123860
DATED : February 3, 2009
INVENTOR(S) : Joseph Soma Reddy and Anthony Acampora It is certified that error appears in the above-identified patent and that said Letters Patent is hereby corrected as shown below:

ON THE TITLE PAGE: item (56);

Column 2, line 5, delete "2001/0036284" and insert --2001/0036184--;

IN THE CLAIMS:

Column 10, line 15 (Claim 1), after "mobile" delete "station";

Column 10, line 55 (Claim 5), after "mobile" delete "station";

Column 11, line 27 (Claim 8), after "mobile" delete "station";

Column 11, line 29 (Claim 8), delete "the associated" and insert --an associated--.

Signed and Sealed this

Seventh Day of April, 2009

JOHN DOLL
*Acting Director of the United States Patent and Trademark Office*